(12) United States Patent
    Stachowiak

(10) Patent No.: US 11,970,960 B2
(45) Date of Patent: *Apr. 30, 2024

(54) CENTRIFUGAL DEBRIS PRE-SEPARATOR FOR TURBINE ENGINE OIL FILTER

(71) Applicant: RAYTHEON TECHNOLOGIES CORPORATION, Farmington, CT (US)

(72) Inventor: David Allen Stachowiak, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/329,473

(22) Filed: May 25, 2021

(65) Prior Publication Data

US 2021/0277811 A1    Sep. 9, 2021

Related U.S. Application Data

(63) Continuation of application No. 15/973,808, filed on May 8, 2018, now Pat. No. 11,073,053.

(51) Int. Cl.
    *F01M 11/03*    (2006.01)
    *B01D 21/26*    (2006.01)
    (Continued)

(52) U.S. Cl.
    CPC ............ *F01M 11/03* (2013.01); *B01D 21/265* (2013.01); *B01D 29/21* (2013.01); *B01D 29/33* (2013.01);
    (Continued)

(58) Field of Classification Search
    CPC .. F01M 11/03; F01M 1/10; F01M 2001/1007; F01M 2001/1035;
    (Continued)

(56) References Cited

U.S. PATENT DOCUMENTS

| 1,856,771 A | 5/1932 | Loeffler |
| 2,983,384 A * | 5/1961 | Winslow ............... B01D 21/267 |
| | | 210/313 |

(Continued)

FOREIGN PATENT DOCUMENTS

| DE | 3409219 | 9/1985 |
| DE | 3941016 | 7/1990 |

(Continued)

OTHER PUBLICATIONS

European Patent Office, European Search Report dated Sep. 24, 2019 in Application No. 19173338.5.

(Continued)

*Primary Examiner* — Madeline Gonzalez
(74) *Attorney, Agent, or Firm* — SNELL & WILMER L.L.P.

(57) ABSTRACT

A fluid filtration assembly (FFA) includes a housing having a thickness defined between an internal surface and an external surface, the housing receiving a filter and defining an outer annular flow passage between an outer surface of the filter and the internal surface of the housing; an inlet pipe communicates with the FFA and injects a fluid into the housing to impart a centrifugal force; an outlet pipe communicates with the FFA and discharges the fluid from the housing; and a collection area disposed towards an end of the outer annular flow passage collects particulate matter from the fluid; wherein a width of the outer annular flow passage increases towards the collection area.

12 Claims, 5 Drawing Sheets

(51) Int. Cl.
  *B01D 29/21*  (2006.01)
  *B01D 29/33*  (2006.01)
  *B01D 29/58*  (2006.01)
  *F01D 25/18*  (2006.01)
  *F01M 1/10*  (2006.01)
  *F02C 7/06*  (2006.01)
  *F16N 39/06*  (2006.01)
  *F02C 3/04*  (2006.01)

(52) U.S. Cl.
  CPC ............. *B01D 29/58* (2013.01); *F01D 25/18* (2013.01); *F01M 1/10* (2013.01); *F02C 7/06* (2013.01); *F16N 39/06* (2013.01); *B01D 2201/32* (2013.01); *F01M 2001/1007* (2013.01); *F01M 2001/1035* (2013.01); *F01M 2001/1057* (2013.01); *F02C 3/04* (2013.01); *F05D 2220/323* (2013.01); *F05D 2260/607* (2013.01); *F05D 2260/98* (2013.01)

(58) Field of Classification Search
  CPC .......... F01M 2001/1057; B01D 21/265; B01D 29/21; B01D 29/33; B01D 29/58; B01D 2201/32; B01D 35/30; F01D 25/18; F02C 7/06; F02C 3/04; F16N 39/06; F16N 2210/02; F16N 2210/08; F05D 2220/323; F05D 2260/607; F05D 2260/98; Y02T 50/60
  USPC ....... 210/388, 256, 303, 304, 315, 338, 342, 210/440–443, 512.1, 248, 455
  See application file for complete search history.

(56) References Cited

U.S. PATENT DOCUMENTS

| | | | |
|---|---|---|---|
| 4,298,465 A | 11/1981 | Druffel | |
| 4,707,165 A | 11/1987 | Tauber et al. | |
| 5,569,373 A * | 10/1996 | Smith | B01D 35/306 210/450 |
| 5,637,217 A | 6/1997 | Herman | |
| 6,183,407 B1 | 2/2001 | Hallgren | |
| 6,666,968 B2 | 12/2003 | Smith et al. | |
| 7,866,875 B2 | 1/2011 | Abe | |
| 8,226,822 B2 | 7/2012 | Paradise | |
| 11,073,053 B2 * | 7/2021 | Stachowiak | F16N 39/06 |
| 2005/0161394 A1 * | 7/2005 | Fritze | B01D 27/08 210/232 |
| 2012/0267293 A1 * | 10/2012 | Ardes | B01D 35/147 210/418 |
| 2013/0098058 A1 | 4/2013 | Sheridan | |
| 2019/0345853 A1 | 11/2019 | Stachowiak | |

FOREIGN PATENT DOCUMENTS

| | | |
|---|---|---|
| DE | 3903675 | 8/1990 |
| DE | 102012219885 | 4/2014 |
| EP | 2246529 | 11/2010 |
| WO | 8302072 | 6/1983 |

OTHER PUBLICATIONS

USPTO, Non-Final Office Action dated Feb. 4, 2020 in U.S. Appl. No. 15/973,808.
USPTO, Final Office Action dated Jul. 8, 2020 in U.S. Appl. No. 15/973,808.
USPTO, Advisory Action dated Oct. 5, 2020 in U.S. Appl. No. 15/973,808.
USPTO, Non-Final Office Action dated Nov. 13, 2020 in U.S. Appl. No. 15/973,808.
USPTO, Notice of Allowance dated Mar. 23, 2021 in U.S. Appl. No. 15/973,808.

* cited by examiner

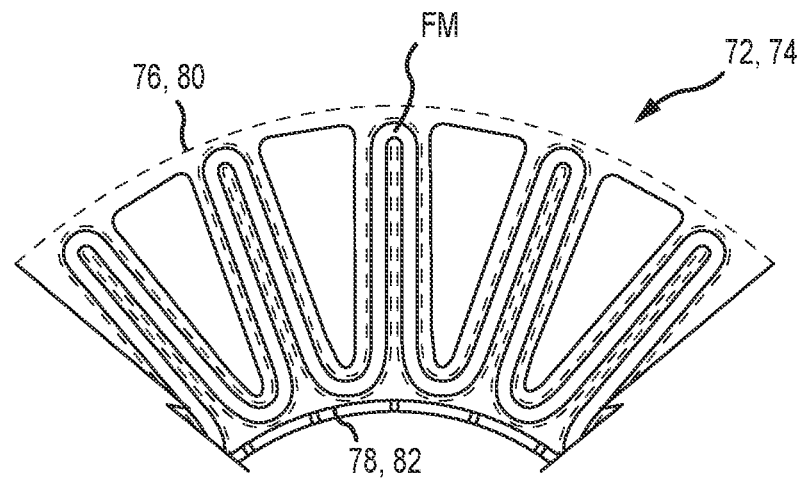
FIG.5-A
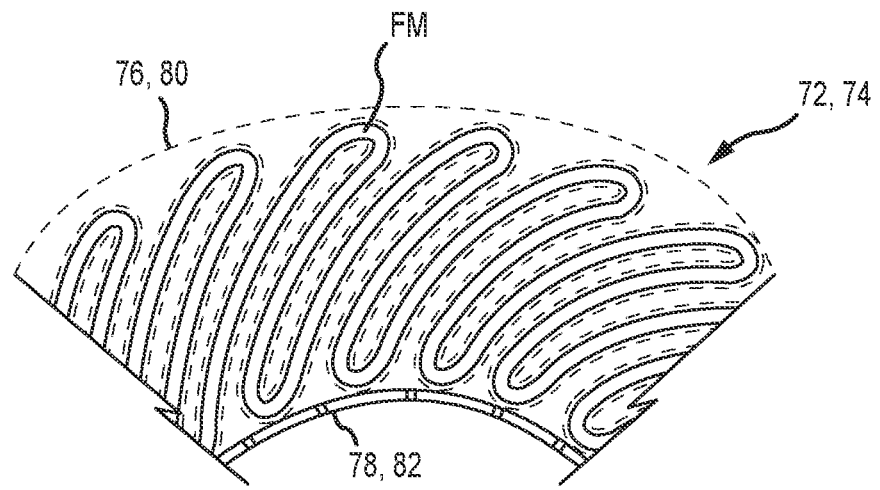
FIG.5-B

CENTRIFUGAL DEBRIS PRE-SEPARATOR FOR TURBINE ENGINE OIL FILTER

CROSS-REFERENCE TO RELATED APPLICATIONS

This application is a continuation of, and claims priority to and the benefit of, U.S. patent application Ser. No. 15/973,808 filed May 8, 2018, and entitled "CENTRIFUGAL DEBRIS PRE-SEPARATOR FOR TURBINE ENGINE OIL FILTER," which is incorporated herein by reference in its entirety for all purposes.

FIELD

This disclosure relates to fluid filtration, such as suitable for use in engine oil filtration of an aircraft engine.

BACKGROUND

Various types of filtering systems are known, including, for example, engine filtration systems that are configured to remove physical contaminants from fluids, such as engine coolants, oil, fuel, hydraulic fluids, transmission fluids, etc. Different types of filter mechanisms find utility in various applications.

Internal combustion engines, such as gas turbine engines, use oil to distribute heat, lubricate bearings, reduce friction, etc. This oil is circulated through the engine and can carry physical contaminants, such as carbon particles, metal particles, dirt, etc., which can harm an engine if not removed from an engine's lubrication system. Accordingly, oil is oftentimes passed through an oil filtration assembly comprising one or more filters in order to remove contaminants from the oil before the oil is recirculated back into the engine.

SUMMARY

In various embodiments, a fluid filtration assembly includes a housing having a thickness defined between an internal surface of the housing and an external surface of the housing, the housing configured to receive a first filter and define an outer annular flow passage between a first outer surface of the first filter and the internal surface of the housing; an inlet pipe in fluid communication with the fluid filtration assembly, the inlet pipe configured to inject a fluid into the housing to impart a centrifugal force; an outlet pipe in fluid communication with the fluid filtration assembly to discharge the fluid from the housing; and a collection area disposed towards an end of the outer annular flow passage distal the inlet pipe, the collection area configured to collect particulate matter from the fluid; wherein a width of the outer annular flow passage increases towards the collection area.

In various embodiments: the thickness of the housing decreases towards the collection area; and/or an outer diameter of the housing increases towards the collection area; and/or the width of the outer annular flow passage increases towards the collection area to augment the centrifugal force; and/or the fluid filtration assembly is an oil filtration assembly and the fluid is an oil; and/or the fluid filtration assembly further includes a drain plug proximate an end cap near the collection area; and/or the fluid filtration assembly further includes a turning vane assembly proximate the inlet pipe; and/or the fluid filtration assembly further includes a second filter configured within the first filter.

In various embodiments, a gas turbine engine includes a fan section configured to induce air from a surrounding environment into the gas turbine engine; a compressor section in fluid communication with the fan section and configured to compress the air received from the fan section; a combustor section in fluid communication with the compressor section and configured to ignite a fuel-air mixture to generate combustion gases; a turbine section in fluid communication with the combustor section; and a debris capture device to remove particulate matter from fluids associated with lubricating rotating components of the gas turbine engine, including a housing having a thickness defined between an internal surface of the housing and an external surface of the housing, the housing configured to receive a first filter and define an outer annular flow passage between a first outer surface of the first filter and the internal surface of the housing; an inlet pipe in fluid communication with the oil filtration assembly, the inlet pipe configured to inject an oil into the housing to impart a centrifugal force; an outlet pipe in fluid communication with the oil filtration assembly to discharge the oil from the housing; and a collection area disposed towards an end of the outer annular flow passage distal the inlet pipe, the collection area configured to collect the particulate matter from the oil; wherein a width of the outer annular flow passage increases towards the collection area.

In various embodiments: the thickness of the housing decreases towards the collection area; and/or an outer diameter of the housing increases towards the collection area; and/or the width of the outer annular flow passage increases towards the collection area to augment the centrifugal force; and/or the gas turbine engine further includes a drain plug proximate an end cap near the collection area; and/or the gas turbine engine further includes a turning vane assembly proximate the inlet pipe; and/or the gas turbine engine further includes a second filter configured within the first filter.

In various embodiments, a method of filtering particulate matter from a fluid filtration assembly includes injecting a fluid into a housing with a centrifugal force; augmenting the centrifugal force within the housing by increasing a width of an outer annular flow passage between a first outer surface of a filter and an internal surface of the housing; an collecting particulate matter from the fluid in a collection area due to the augmented centrifugal force before the particulate matter impacts the filter.

In various embodiments: the method further includes discharging the fluid from the housing; and/or the fluid filtration assembly is an oil filtration assembly and the fluid is an oil; and/or the fluid filtration assembly is a component of a gas turbine engine; and/or the method further includes additionally augmenting the centrifugal force by imparting an additional rotational force to the fluid as the fluid enters the housing.

BRIEF DESCRIPTION OF THE DRAWINGS

The accompanying drawings illustrate various embodiments employing the principles described herein and are a part of the specification. The illustrated embodiments are meant for description only, and they do not limit the scope of the claims, and in which:

FIG. 5-A and FIG. 5-B are partial top views of various filter media of a filter, in accordance with various embodiments;

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

In accordance with various aspects of this disclosure, systems and methods are described for pre-separating particulate matter before it passes through one or more filters within a fluid filtration system, such as an oil filtration system. In various embodiments, the systems and methods enable less particulate matter to impact filter(s) within filtration systems.

Figure 1:
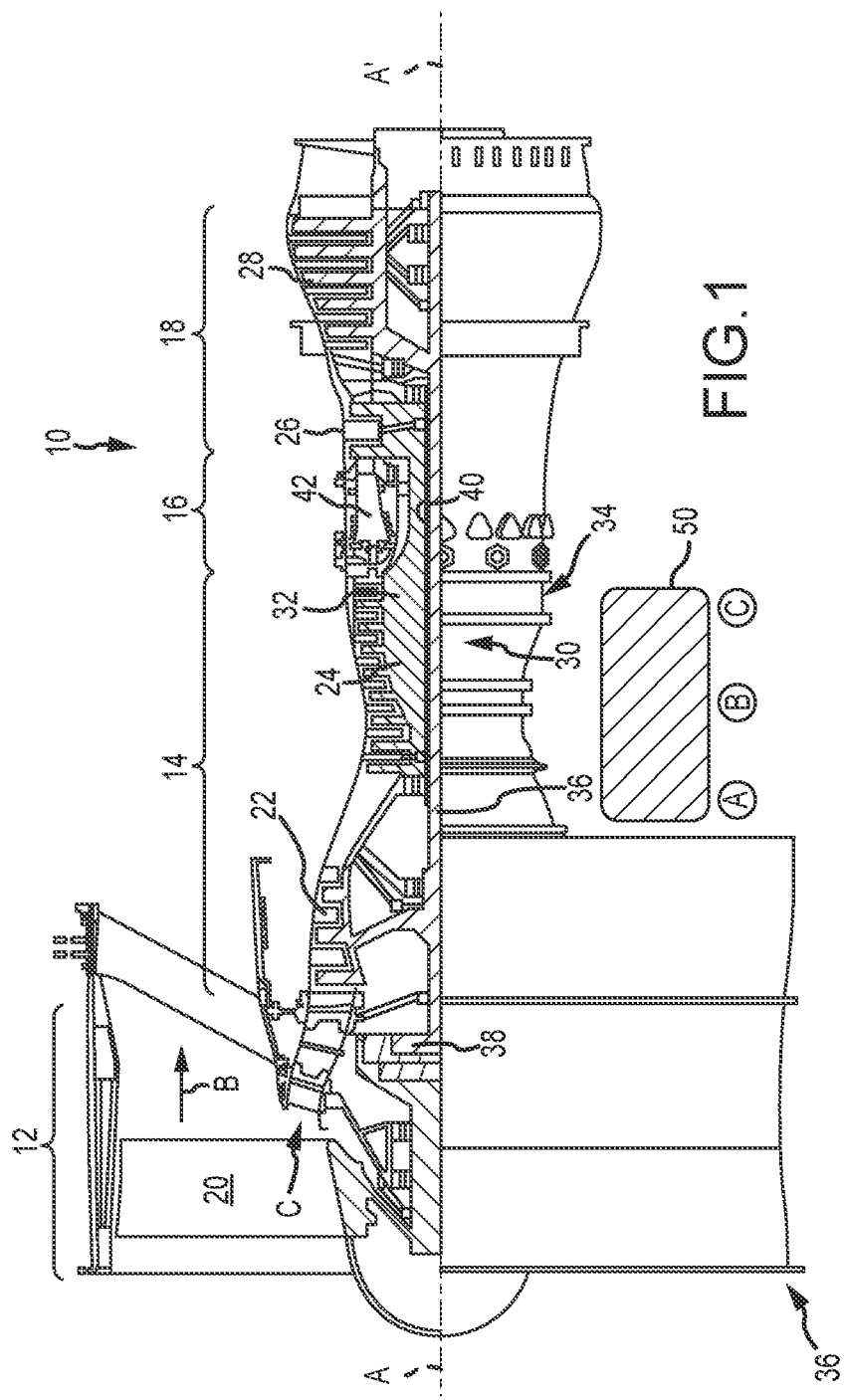
FIG. 1 is a representative illustration of a gas turbine engine having an oil filtration system, in accordance with various embodiments.

Referring now to FIG. 1, a representative gas turbine engine 10 is a multi-spool turbofan having rotating components and incorporating a fan section 12, a compressor section 14, a combustor section 16, and a turbine section 18. In various embodiments, the gas turbine engine 10 includes other systems and features too.

In various embodiments, the fan section 12 is positioned towards a front or inlet of the gas turbine engine 10, and it includes a fan 20 that induces air from a surrounding environment into the gas turbine engine 10 and accelerates a portion of the air towards the compressor section 14.

In various embodiments, the fan section 12 drives the air along a bypass flowpath B while the compressor section 14 drives the air along a core flowpath C for acceleration, communication, and compression into the combustor section 16, then expansion within the turbine section 18.

In various embodiments, the compressor section 14 raises the pressure of the air received from the fan section 12 to a relatively high level. The compressed air from the compressor section 14 then enters the combustor section 16, where one or more fuel nozzles inject fuel into the compressed air. The fuel-air mixture is ignited in the combustor section 16 to generate combustion gases. The high-energy combustion gases from the combustor section 16 then flow into and through the turbine section 18, thereby causing rotationally mounted turbine blades to rotate and generate energy. The air exiting the turbine section 18 is exhausted from the gas turbine engine 10 via an exhaust section.

In various embodiments, the gas turbine engine 10 includes one or more of a low pressure compressor (LPC) 22, a high pressure compressor (HPC) 24, a high pressure turbine (HPT) 26, and/or a low pressure turbine (LPT) 28.

In various embodiments, the gas turbine engine 10 is or includes other types of engines, such as turbojets, turboshafts, three-spool (plus fan) turbofans, and/or direct drive turbofans. In various embodiments, an intermediate spool includes an intermediate pressure compressor (not shown) between the LPC 22 and the HPC 24 and/or an intermediate pressure turbine (not shown) between the HPT 26 and the LPT 28.

In various embodiments, the gas turbine engine 10 includes a low spool 30 and a high spool 32 mounted for rotation about an engine central longitudinal axis A-A' relative to an engine static structure or engine case 34 via multiple bearing structures. In various embodiments, the low spool 30 includes an inner shaft 36 that interconnects the fan 20 of the fan section 12, the LPC 22 of the compressor section 14, and the LPT 28 of the turbine section 18. In various embodiments, the inner shaft 36 communicates with the fan 20 directly or through a geared architecture 38 to drive the low spool 30 at a higher speed than the fan 20. In various embodiments, a reduction transmission is an epicyclic transmission, such as a planetary or star gear system.

In various embodiments, the high spool 32 includes an outer shaft 40 that interconnects the HPC 24 of the compressor section 14 and the HPT 26 of the turbine section 18. In various embodiments, a combustor 42 is arranged between the HPC 24 and the HPT 26. In various embodiments, the inner shaft 36 and the outer shaft 40 are concentric and rotate about the engine central longitudinal axis A-A' that is collinear with their longitudinal axes. Core airflow flowing along core flowpath C is compressed by the LPC 22, further compressed by the HPC 24, mixed with fuel, burned in the combustor 42, and then expanded over the HPT 26 and the LPT 28. In various embodiments, the HPT 26 and the LPT 28 rotationally communicate with the high spool 32 and the low spool 30, respectively, in response to the expansion.

In various embodiments, the gas turbine engine 10 is a high-bypass geared aircraft engine. In various embodiments, the gas turbine engine 10 bypass ratio is greater than approximately 6:1. In various embodiments, the geared architecture 38 includes an epicyclic gear train, such as a planetary gear system or other gear system. In various embodiments, the example epicyclic gear train has a gear reduction ratio of greater than approximately 2.3:1, and, in other embodiments, it is greater than approximately 2.5:1. In various embodiments, the geared turbofan enables operation of the low spool 30 at higher speeds that can increase the operational efficiency of the LPC 22 and the LPT 28 and render increased pressure in fewer numbers of stages.

A pressure ratio associated with the LPT 28 is pressure-measured prior to the inlet of the LPT 28 as related to the pressure at the outlet of the LPT 28 prior to an exhaust nozzle of the gas turbine engine 10. In various embodiments, the bypass ratio of the gas turbine engine 10 is greater than approximately 10:1, the fan 20 diameter is significantly larger than that of the LPC 22, and the LPT 28 has a pressure ratio that is greater than approximately 5:1.

In various embodiments, a significant amount of thrust is provided by the bypass flowpath B due to the high bypass ratio. In various embodiments, the fan section 12 is suited for a particular flight condition—e.g., cruising at approximately 0.8 Mach and/or approximately 35,000 feet (10,668 meters). This flight condition, with the gas turbine engine 10 at a preferred fuel consumption, is known as thrust specific fuel consumption (TSFC), which is an industry-standard parameter of fuel consumption per unit of thrust.

Fan pressure ratio is a pressure ratio across a blade of the fan 20 in the fan section 12 without using a fan exit guide vane system. In various embodiments, a low fan pressure ratio of the gas turbine engine 10 is less than 1.45. A low corrected fan tip speed is the actual fan tip speed divided by an industry-standard temperature correction of $(T_{AMB}/518.7)$ (0.5), in which $T_{AMB}$ is an ambient temperature measurement in degrees Rankine. In various embodiments, the low corrected fan tip speed of the gas turbine engine 10 is less than approximately 1,150 feet (351 meters) per second.

Figure 2:
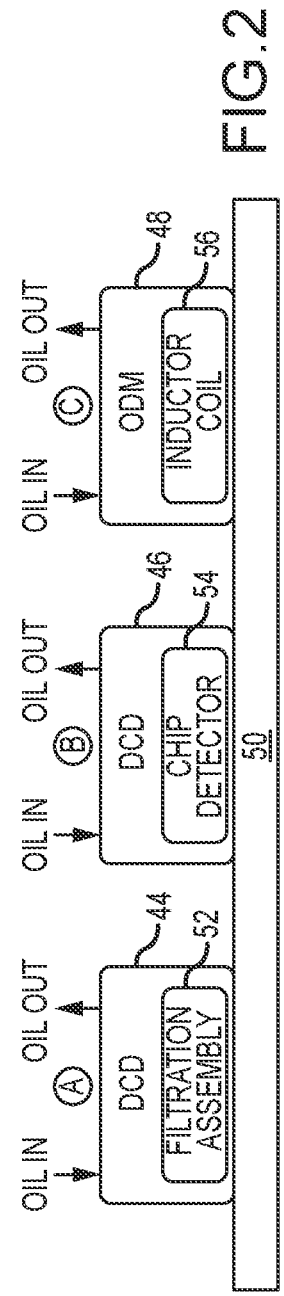
FIG. 2 is simplified schematic of a lubrication oil system of the gas turbine engine of FIG. 1, in accordance with various embodiments.

In various embodiments, the gas turbine engine 10 also includes a first debris capture device (DCD) 44, a second debris capture device (DCD) 46, and/or an oil debris monitor (ODM) 48, each configured for operation with a lubrication oil system of the gas turbine engine 10. In various embodiments, the first DCD 44, the second DCD 46, and/or the ODM 48 are associated with and/or proximate to an accessory gearbox 50 that is proximate the compressor section 14, with the first DCD 44 being located at a first location A proximate the accessory gearbox 50, the second DCD 46 being located at a second location B proximate the accessory gearbox 50, and the ODM 48 being located at a third location C proximate the accessory gearbox 50 (e.g., see FIG. 2). Such an arrangement/placement is referred to as a core mount, with the first DCD 44, the second DCD 46, and/or the ODM 48 being located generally proximate the compressor section 14. In various embodiments, the first DCD 44, the second DCD 46, and/or the ODM 48 are also located generally proximate the fan section 12, and such an arrangement/placement is referred to as a fan mount, as well as in other locations throughout the gas turbine engine 10 as well, for example. In various embodiments, oil flows into and/or out of one or more of the first DCD 44, the second DCD 46, and/or the ODM 48.

In various embodiments, the first DCD 44, the second DCD 46, and/or the ODM 48 are located at various locations within the lubrication oil system of the gas turbine engine 10, thereby assisting in localizing the source of particulate matter (e.g., contaminants, debris, dirt, flecks of material, sediment, etc.) within the gas turbine engine 10. For example, in various embodiments, the first DCD 44 and/or the second DCD 46 are located downstream within the lubrication oil system of particular components that are subject to particular wear within the gas turbine engine 10, whereby the detection of particulate matter within a particular DCD indicates a particular component within a particular part of the gas turbine engine 10 is, or may be, degrading. In various embodiments, an initial DCD to detect debris can be assumed to be a closest DCD downstream of a particular component that is providing debris to the lubrication oil system of the gas turbine engine 10. Thus, once a DCD in such a state is identified, components upstream of that component are considered suspect, in various embodiments. In various embodiments, secondary indications (e.g., temperature variations, vibrations, etc.) are also used to identify suspect components.

In various embodiments, information from the first DCD 44, the second DCD 46, and/or the ODM 48 is analyzed to determine whether or not the gas turbine engine 10 is operating within predetermined limits.

In various embodiments, the first DCD 44 includes a filtration assembly, such as an oil filtration assembly (OFA) 52, that is configured to detect and extract magnetic and/or non-magnetic particles that are carried by the lubrication oil of the gas turbine engine 10, and the second DCD 46 includes a chip detector 54 that is configured to detect and extract magnetic particles that are carried by the lubrication oil of the gas turbine engine 10. In various embodiments, the ODM 48 includes an inductor coil 56 that is configured to enable the ODM 48 to determine one or more of a debris particle's composition, count, mass, size, etc. In various embodiments, these particle characteristics are analyzed at single points in time, cumulatively over time, and/or as rates of change over time, for example.

Figure 3:
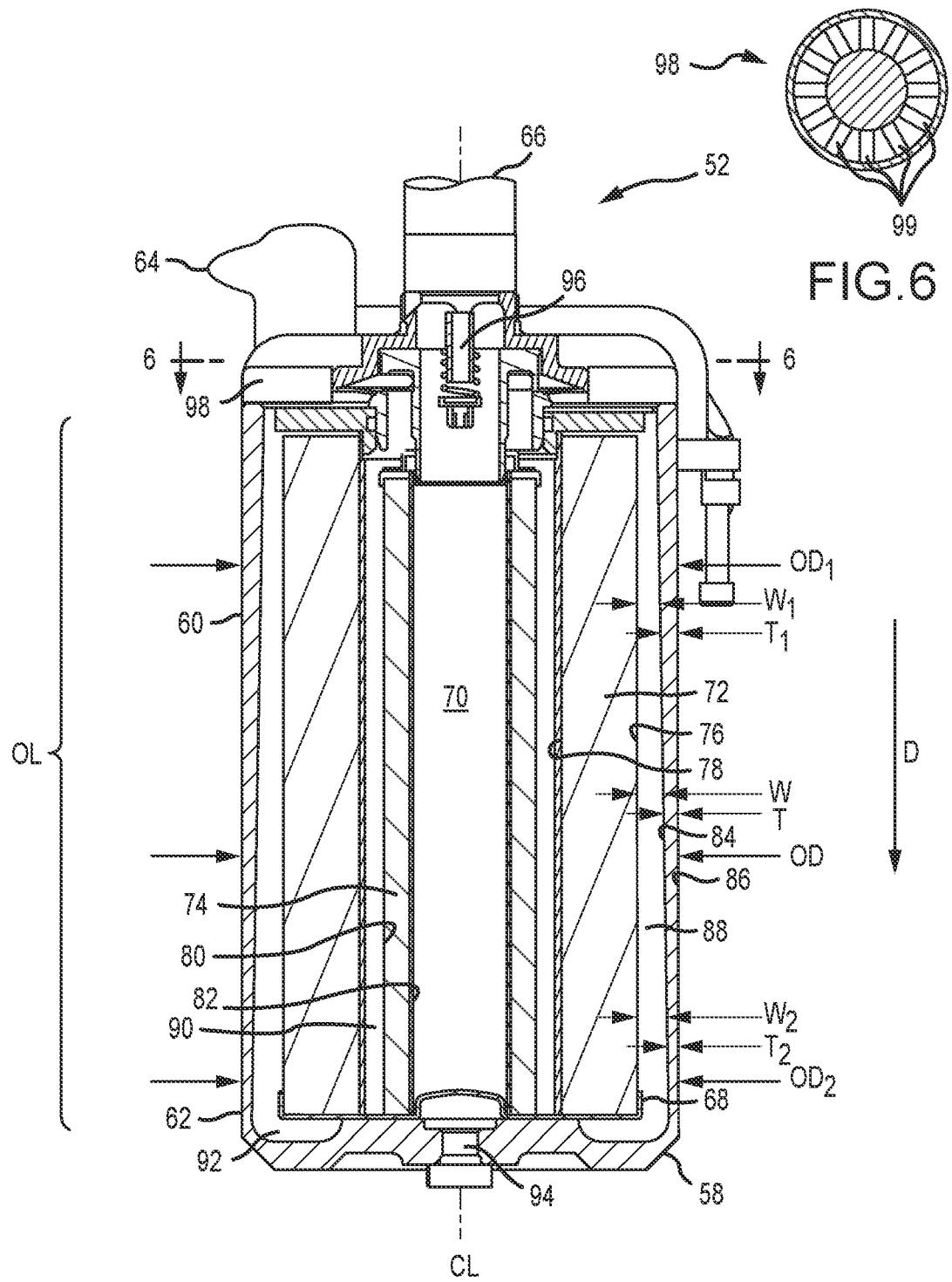
FIG. 3 is a cross-sectional elevation view of an oil filtration assembly of the gas turbine engine of FIG. 1, in accordance with various embodiments.
Figure 4:
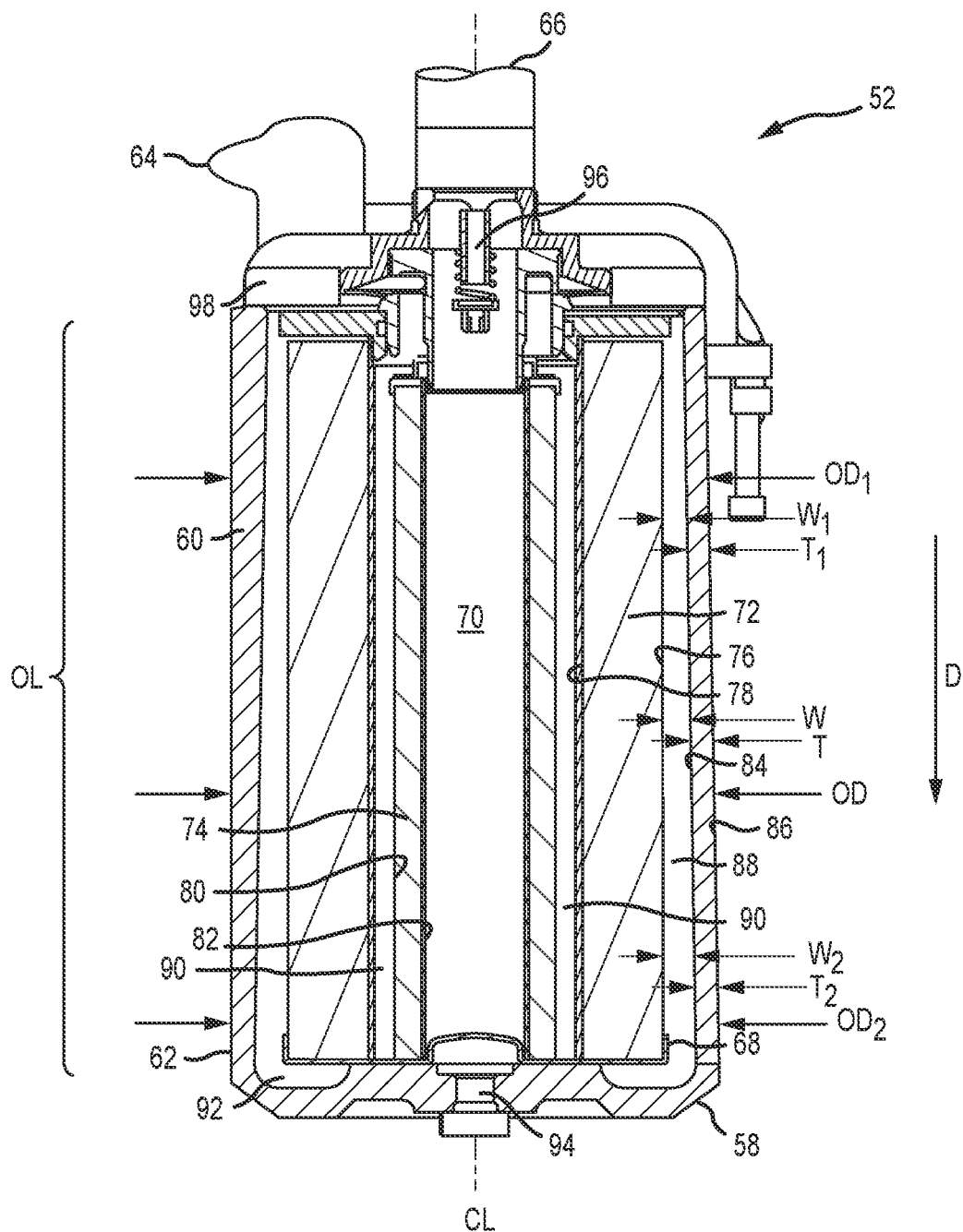
FIG. 4 is also a cross-sectional elevation view of an oil filtration assembly of the gas turbine engine of FIG. 1, in accordance with various embodiments.

Generally referring now to FIG. 3 and FIG. 4, the OFA 52 includes a housing 58 having a first section 60 and conjoined second section 62 distal from the first section 60. In various embodiments, a length of the first section 60 and a length of the second section 62 sum to an overall length OL of the housing 58.

In the figures, the OFA 52 is generally oriented vertically, with the first section 60 disposed above the second section 62. However, any and all position orientations referenced or implied herein (e.g., above, below, bottom, top, etc.) are used as arbitrary reference positions only, based on a convenience of describing the components in the figures; they do not necessarily or preferably refer to the positions of elements with respect to a gravitation pull of the Earth, nor to any other extrinsic and/or intrinsic reference forces to which the OFA 52 is, or may be, subjected.

Fluid flow (e.g., oil) enters the OFA 52 through an inlet pipe 64 that is disposed proximate to, and/or within, the first section 60 and exits the OFA 52 through an outlet pipe 66 that is also disposed proximate to, and/or within, the first section 60. The inlet pipe 64 and the outlet pipe 66 are fluidly connected internally within the housing 58.

As a fluid (e.g., oil) enters the OFA 52 through the inlet pipe 64, it flows perpendicularly into the first section 60 through a bend, corner, curve, etc. of the inlet pipe 64. This tangential (or substantially tangential) injection imparts a rotational flow (e.g., spin) to the fluid (e.g., oil) relative to a centerline CL as it enters the first section 60. More specifically, an angled orientation (e.g., tangential or substantially tangential) of the inlet pipe 64 relative to the centerline CL of the OFA 52 creates a cyclonic effect for the fluid (e.g., oil) as it enters the first section 60 of the OFA 52 and travels through the first section 60 and into the second section 62. After the fluid enters the first section 60, at least part of the fluid cyclonically travels down the OFA 52 and into the second section 62, which is a continuation of the first section 60 of the housing 58. At a distal end of the second section 62, an end cap 68 forces fluid (e.g., oil) back up the OFA 52 towards the first section 60 through a center cavity 70 en-route to the outlet pipe 66, which is in fluid communication with the first section 60 and the second section 62 throughout the overall length OL of the housing 58 and discharges the fluid (e.g., oil) from the OFA 52.

Internally within the OFA 52, a first (or primary) filter 72 and/or a second (or secondary) filter 74 is/are disposed within the housing 58, each running substantially the length of the first section 60 and the second section 62 (e.g., the overall length OL) of the housing 58 towards the end cap 68. In various embodiments, the end cap 68 terminates at or about an outer radial limit of the first filter 72, thereby generally defining a bottom surface to seat the first filter 72 and/or the second filter 74 within the housing 58. In various embodiments, the end cap 68, the first filter 72, and/or the second filter 74 are bound together, such as with an adhesive or the like.

In various embodiments, the first filter 72 and/or the second filter 74 are primarily annular structures, aligned substantially coaxially and symmetrically along the centerline CL of the OFA 52—e.g., in a nested and/or multi-stage relationship with one another, in various embodiments.

In various embodiments, the first filter 72 comprises a filter media FM with porous passages disposed between a first outer surface 76 and a first inner surface 78. In various embodiments, the first filter 72 is a substantially cylindrical outside-in filter, configured such that the first outer surface 76 is, effectively, a filter inlet, and the first inner surface 78 is, effectively, a filter outlet. In various embodiments, the fluid (e.g., oil) generally flows from the first outer surface 76 towards and through the first inner surface 78, and then generally towards the second filter 74. In various embodiments, the first filter 72 has multiple outer surfaces and multiple inner surfaces (e.g., see FIG. 5-A and FIG. 5-B), for which reference herein to the first outer surface 76 of the first filter 72 generally refers to a part or portion of the first filter 72 that extends radially furthest from the first filter 72 in relation to the centerline CL, and reference herein to the first inner surface 78 of the first filter 72 generally refers to a part or portion of the first filter 72 that extends radially closest from the first filter 72 in relation to the centerline CL.

In various embodiments, the second filter 74 also comprises a filter media FM with porous passages disposed between a second outer surface 80 and a second inner surface 82. In various embodiments, the second filter 74 is also a substantially cylindrical outside-in filter, configured such that the second outer surface 80 is, effectively, a filter inlet, and the second inner surface 82 is, effectively, a filter outlet. In various embodiments, the fluid (e.g., oil) generally flows from the second outer surface 80 towards and through the second inner surface 82, and then generally towards the center cavity 70. In various embodiments, the second filter 74 has multiple outer surfaces and multiple inner surfaces (e.g., see FIG. 5-A and FIG. 5-B), for which reference herein to the second outer surface 80 of the second filter 74 generally refers to a part or portion of the second filter 74 that extends radially furthest from the second filter 74 in relation to the centerline CL, and reference herein to the second inner surface 82 of the second filter 74 generally refers to a part or portion of the second filter 74 that extends radially closest from the second filter 74 in relation to the centerline CL.

In various embodiments, the second inner surface 82 of the second filter 74 defines the center cavity 70, and the center cavity 70 forms a hollow core passage directed towards the outlet pipe 66. In various embodiments, the center cavity 70 runs the overall length OL, or substantially the overall length OL, of the housing 58. In various embodiments, the center cavity 70 is shorter than the overall length OL of the housing 58. In various embodiments, the center cavity 70 is longer than the overall length OL of the housing 58.

In various embodiments, the housing 58 is generally defined by an internal surface 84 and an external surface 86, comprising a thickness T between the internal surface 84 and the external surface 86. The thickness T is generally defined throughout the overall length OL of the housing 58, and the thickness T may be the same or different between the first section 60 and the second section 62, including generally varying over the overall length OL of the housing 58.

In various embodiments, the first outer surface 76 of the first filter 72 is positioned, spaced, and/or sized internally apart from the internal surface 84 of the housing 58 to form an outer annular flow passage 88 between the first outer surface 76 of the first filter 72 and the internal surface 84 of the housing 58.

In various embodiments, the outer annular flow passage 88 extends further than the end cap 68 at the distal end of the second section 62 of the housing 58.

In various embodiments, the first inner surface 78 of the first filter 72 is positioned, spaced, and/or sized internally apart from the second outer surface 80 of the second filter 74 to form an inner annular flow passage 90 between the first inner surface 78 of the first filter 72 and the second outer surface 80 of the second filter 74.

In various embodiments, fluid (e.g., oil) from the gas turbine engine 10 tangentially enters the OFA 52 at the inlet pipe 64 and flows in and though the outer annular flow passage 88, the first filter 72, the inner annular flow passage 90, the second filter 74, the center cavity 70, and/or the outlet pipe 66 of the OFA 52, before returning and/or being returned to the gas turbine engine 10 of FIG. 1.

In various embodiments, the first filter 72 and/or the second filter 74 are formed with pleated materials as the filter media, such as shown, for example, in FIGS. 5-A and 5-B.

In various embodiments, the filter media FM of the first filter 72 and/or the filter media FM of the second filter 74 is/are configured to remove particulate contaminants from the oil as the oil passes through the filter media FM of the first filter 72 and/or the second filter 74. In various embodiments, the filter media FM of the first filter 72 and/or the filter media FM of the second filter 74 is/are configured to remove particulate contaminants from the oil before the oil is recirculated back to gas turbine engine 10 of FIG. 1 through the outlet pipe 66.

In various embodiments, the filter media FM of the first filter 72 and the filter media FM of the second filter 74 are made of the substantially the same materials. In various embodiments, the filter media FM of the first filter 72 and the filter media FM of the second filter 74 are made of the substantially different materials. In various embodiments, they are configured with the same or different grades and/or levels of filtration capacities (e.g., mesh layers), as well as different lengths and/or radial sizes.

In various embodiments, the OFA 52 includes one or more filters within the housing 58, such as the first filter 72 and/or the second filter 74. In various embodiments, the OFA 52 includes the first filter 72 and not the second filter 74. In various embodiments, the OFA 52 includes the second filter 74 and not the first filter 72. In various embodiments, the OFA 52 includes both the first filter 72 and the second filter 74. In various embodiments, the OFA 52 includes other filters too.

In various embodiments of operation, the first filter 72 and/or the second filter 74 prevent and/or lessen particulate matter from recirculating to the gas turbine engine 10.

In various embodiments of operation, the more particulate matter that the first filter 72 and/or the second filter 74 extract from the fluid (e.g., oil), the less particulate matter that is recirculated back to the gas turbine engine 10.

In various embodiments of operation, the more particulate matter that the first filter 72 and/or the second filter 74 extract from the fluid (e.g., oil), the more often the first filter 72 and/or the second filter 74 will need to be changed, cleaned, and/or replaced. Conversely, the less particulate matter that the first filter 72 and/or the second filter 74 extract from the fluid (e.g., oil), the less often the first filter 72 and/or the second filter 74 will need to be changed, cleaned, and/or replaced. Accordingly, the less particulate matter that impacts the first filter 72 and/or the second filter 74 improves working lives of the first filter 72 and/or the second filter 74, provided sufficient particulate matter can be and/or is extracted from the fluid (e.g., oil) to still be able to protect the gas turbine engine 10 as the fluid (e.g., oil) is recirculated from the OFA 52 back through the outlet pipe 66 and to the gas turbine engine 10.

If particulate matter is extracted from the fluid (e.g., oil) before it impacts the first filter 72 and/or the second filter 74, then the first filter 72 and/or the second filter 74 will have less particulate matter to extract, in various embodiments.

One way to decrease, lessen, and/or reduce the amount of particulate matter impacting the first filter 72, and, by extension, also the second filter 72 and the gas turbine engine 10, is to pre-separate particulate matter within the OFA 52 before it impacts the first filter 72.

In various embodiments, a centrifugal action imparted by the tangential inlet pipe 64 decreases the amount of particulate matter impacting the first filter 72. More specifically, as the fluid (e.g., oil) enters the first section 60 of the OFA 52 from the inlet pipe 64, centrifugal forces imparted by the inlet pipe 64 intersecting the housing 58 of the OFA 52 cause heavier particulate matters to be forced against the internal surface 84 of the housing 58 within the outer annular flow passage 88, due to a swirling downward flow of the fluid (e.g., oil) through the outer annular flow passage 88 from the first section 60 and/or the second section 62. In general, the greater the offset of the inlet pipe 64 relative to the housing 58 and/or the centerline CL, the greater are the centrifugal forces that are imparted to the fluid (e.g., oil). More specifically, if the inlet pipe 64 is disposed tangentially, or substantially tangentially, to the internal surface 84 of the housing 58, then a large amount of centrifugal forces in the entering fluid (e.g., oil) are created, in various embodiments.

As the heavier particulate matters are forced against the internal surface 84 of the housing 58 within the outer annular flow passage 88, they are swept down into a collection area 92 disposed towards a bottom of the outer annular flow passage 88, towards a distal end of the second section 62 of the OFA 52 relative to the first section 60. In various embodiments, the action of the fluid (e.g., oil) within the housing 58 is that of a downward swirling vortex. This circular, spiraling tornadic motion suspends heavier contamination particles, which are often metal particles, in the outer annular flow passage 88 before they impact the first filter 72, and they are carried down towards the collection area 92.

In various embodiments, the collection area 92 is proximate the end cap 68. In various embodiments, the collection area 92 is underneath the end cap 68. In various embodiments, the collection area 92 is formed between the end cap 68 and a bottom surface of the OFA 52. In various embodiments, the collection area 92 is annularly shaped like a bowl, extending out from a bottom end of the outer annular flow passage 88 in the second section 62 of the OFA 52.

In various embodiments, the collection area 92 annularly surrounds and/or partially surrounds the bottom or underside of the first filter 72 for collecting debris from the outer annular flow passage 88 before it impacts the first filter 72 and/or second filter 74.

In various embodiments, particulate matter within the fluid (e.g., oil) enters the first section 60 of the OFA 52 at the inlet pipe 64 and is caused to cyclonically work its way down to the bottom of the second section 62 along the outer annular flow passage 88 due to the centrifugal forces on the fluid (e.g., oil) as it travels through the outer annular flow passage 88. Other parts of the fluid (e.g., oil) now have fewer, less, lighter, and/or smaller amounts of particulate matter as they pass through the first filter 72, the second filter 74, and/or the center cavity 70.

The heavier particulate matter is centrifugally forced outward while the relatively cleaner fluid (e.g., oil) impacts the first filter 72 and/or the second filter 74.

At the bottom of the second section 62 and/or at the end cap 68, the fluid (e.g., oil) reverses its flow and travels back upward through the center cavity 70, in various embodiments, leaving the particulate matter as deposited in the collection area 92 at or towards the bottom of the second section 62 of the housing 58.

In various embodiments, a drain plug 94 is provided in or near the end cap 68 for draining the fluid (e.g., oil) retained in the housing 58 before servicing the OFA 52. By accumulating particulate matter within the collection area 92 before it impacts the first filter 72 and/or the second filter 74, maintenance intervals for servicing the first filter 72 and/or the second filter 74 are extended for the OFA 52 and/or gas turbine engine 10 of FIG. 1, in various embodiments.

In various embodiments, the OFA 52 further includes a bypass valve 96 proximate the inlet pipe 64 and the first section 60 of the housing 58 for communicatively separating the first filter 72 from the second filter 74. More specifically, the bypass valve 96 permits and/or forces the fluid (e.g., oil) to bypass the first filter 72 and outer annular flow passage 88 and directs the fluid (e.g., oil) only and/or primarily towards the second filter 74 and inner annular flow passage 90, such as when the first filter 72 and/or collection area 92 become too dirty or clogged to be effectively used and/or otherwise subject the fluid (e.g., oil) to only a reduced or single level of filtration by the second filter 74. For example, if the first filter 72 and/or the collection area 92 become relatively clogged, fluid flow through the first filter 72 and/or the outer annular flow passage 88 and/or the collection area 92 becomes reduced, and pressure in the outer annular flow passage 88 exceeds a threshold, then the bypass valve 96 is forced open, allowing the fluid (e.g., oil) to bypass the outer annular flow passage 88 and only enter the inner annular flow passage 90, in various embodiments. In various embodiments, the bypass valve 96 bypasses the first filter 72. In various embodiments, bypassing the first filter 72 occurs for only approximately one cycle of (or limited numbers of), or flight(s) with, the gas turbine engine 10 of FIG. 1, after which the OFA 52 and/or the first filter 72 and/or the collection area 92 is/are serviced.

In various embodiments, cyclonic pre-separation is combined with filters for removing debris and/or wear particles before recirculating fluid (e.g., oil) to an engine, such as the gas turbine engine 10 of FIG. 1. In various embodiments, the pre-separation occurs before filtration with the first filter 72 and/or the second filter 74.

For augmenting the cyclonic effect induced by the tangential inlet pipe 64, a radial width W of the outer annular flow passage 88 gradually varies from the first section 60 to the second section 62 of the OFA 52 along the overlength OL of the housing 58. For example, the radial width W of the outer annular flow passage 88 gradually increases from the first section 60 to the second section 62, which augments the centrifugal force applied to the fluid (e.g., oil) as it moves down the OFA 52 in the direction D, which is generally aligned with the centerline CL of the OFA 52 and extends from the first section 60 towards the second section 62. As fluid (e.g., oil) enters the OFA 52 through the inlet pipe 64 and travels in the direction D from the first section 60 to the second section 62, the gradually increasing radial width W of the outer annular flow passage 88 increases the centrifugal force applied to particulate matter travelling through the OFA 52 and forces more of the particulate matter to be driven into the collection area 92 than would occur if the radial width W of the outer annular flow passage 88 was a constant or decreasing throughout the overall length OL of the OFA 52 in the direction D.

In various embodiments, a first average radial width $W_1$ of the outer annular flow passage 88 in the first section 60 is less than a second average radial width $W_2$ of the outer annular flow passage 88 in the second section 62 (e.g., $W_1 < W_2$).

In various embodiments, the first average radial width $W_1$ of the outer annular flow passage 88 is defined as an average of radial widths W of the first section 60, and the second average radial width $W_2$ of the outer annular flow passage 88 is defined as an average of radial widths W of the second section 62.

In various embodiments, one configuration to increase the radial width W of the outer annular flow passage 88 from the first section 60 to the second section 62 is to decrease the thickness T of the housing 58 in the direction D. For example, as shown in the embodiment in FIG. 3, a thickness T of the housing 58 between the internal surface 84 and the external surface 86 gradually varies from the first section 60 to the second section 62 of the OFA 52 along the overlength OL of the housing 58. For example, the thickness T of the housing 58 gradually decreases from the first section 60 to the second section 62, thereby allowing the outer annular flow passage 88 to correspondingly increase its radial width W, in various embodiments.

In various embodiments, a first average thickness $T_1$ of the housing 58 in the first section 60 is greater than a second average thickness $T_2$ of the housing 58 in the second section 62 (e.g., $T_1 > T_2$).

In various embodiments, the first average thickness $T_1$ of the housing 58 is defined as an average of thicknesses T of the first section 60, and the second average thickness $T_2$ of the housing 58 is defined as an average of thicknesses T of the second section 62.

In various embodiments, the first average radial width $W_1$ of the outer annular flow passage 88 in the first section 60 plus the first average thickness $T_1$ of the housing 58 in the first section 60 is equal, or substantially equal, to the second average radial width $W_2$ of the outer annular flow passage 88 in the second section 62 plus the second average thickness $T_2$ of the housing 58 in the second section 62 (e.g., $W_1 + T_1 \approx W_2 + T_2$), such that a first outer diameter $OD_1$ of the housing 58 in the first section 60 is equal, or substantially equal, to a second outer diameter $OD_2$ of the housing 58 in the second section 62 (e.g., $OD_1 \approx OD_2$). This arrangement allows the outer annular flow passage 88 to increase in radial width W from the first section 60 to the second section 62 while maintaining a constant or near constant outer diameter OD of the housing 58 about its overall length OL, in various embodiments, such as shown in FIG. 3 and/or described herein.

Referring now to FIG. 4, it is identical, and/or nearly identical, to FIG. 3 in various ways. In both embodiments, for example, the first average radial width $W_1$ of the outer annular flow passage 88 in the first section 60 is less than the second average radial width $W_2$ of the outer annular flow passage 88 in the second section 62 (e.g., $W_1 < W_2$). In various embodiments, such as in FIG. 3, this is accomplished by decreasing the first average thickness $T_1$ of the housing 58 in the first section 60 from the second average thickness $T_2$ of the housing 58 in the second section 62 along the direction D. In various embodiments, such as in FIG. 4, this is accomplished by increasing the first average outer diameter $OD_1$ of the housing 58 in the first section 60 from the second average outer diameter $OD_2$ of the housing 58 in the second section 62 along the direction D (e.g., $OD_1 < OD_2$).

More specifically, the first average outer diameter $OD_1$ of the housing 58 is defined as an average of outer diameters OD of the first section 60, and the second average outer diameter $OD_2$ of the housing 58 is defined as an average of outer diameters OD of the second section 62. Accordingly, as the outer diameter OD of the housing 58 increases in the direction D, the OFA 52 flares generally outwards in the second section 62 as compared to the first section 60, such that the OFA 52 takes the shape of a partial frustoconical-like structure in its housing 58, with the outer diameter OD increasing in the direction D from the first section 60 towards the second section 62. This arrangement allows the outer annular flow passage 88 to increase in radial width W from the first section 60 to the second section 62 while maintaining a constant thickness T of the housing 58 about its overall length OL (e.g., $T_1 \approx T_2$), in various embodiments, such as shown in FIG. 4 and/or described herein.

As a convenience to the reader, but not by way of limitation, in FIG. 3, $W_2 > W_1$, $OD_1 \approx OD_2$, $T_1 > T_2$, and $W_1 + T_1 \approx W_2 + T_2$, and in FIG. 4, $W_2 > W_1$, $OD_1 < OD_2$, $T_1 \approx T_2$, and $W_1 + T_1 < W_2 + T_2$—in various embodiments.

Figure 6:
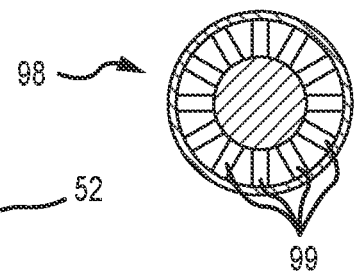
FIG. 6 is partial cross-sectional view taken along line 6-6 in FIG. 3, with various elements removed and/or simplified to show a turning valve assembly, in accordance with various embodiments.

For additionally augmenting the cyclonic effect induced by the tangential inlet pipe 64, the OFA 52 also optionally includes a turning vane assembly 98 disposed in the first section 60 proximate the inlet pipe 64, in various embodiments. More specifically, the turning vane assembly 98 includes a plurality of blades 99 (e.g., see FIG. 6) that are configured to spin about the centerline CL so as to further distribute the fluid (e.g., oil) circumferentially into the outer annular flow passage 88 upon entering the OFA 52, thereby increasing the centrifugal effect on the fluid (e.g., oil), in various embodiments. In various embodiments, the turning vane assembly 98 increases the rotational flow of the fluid (e.g., oil) before and/or as it enters the first section 60 of the OFA 52. This augmented rotational flow imparts an additional centrifugal force in addition to, and/or instead of, the tangential injection of the inlet pipe 64, in various embodiments.

Figure 7:
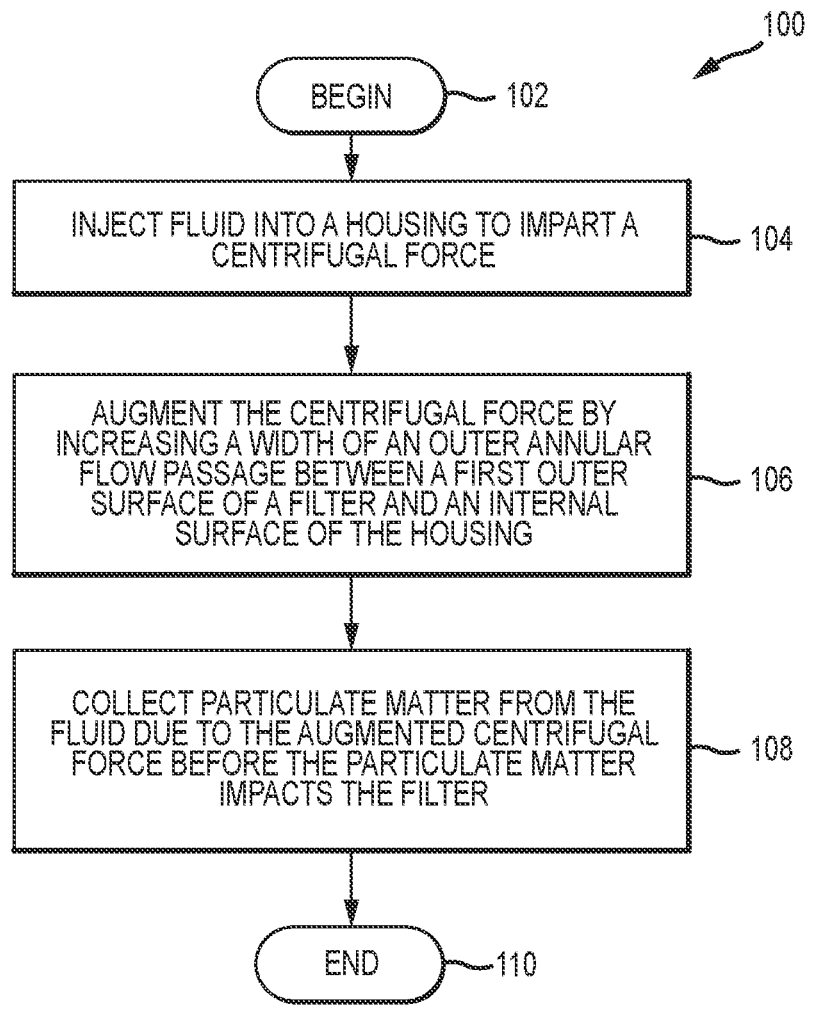
FIG. 7 illustrates a method of filtering particulate matter from a gas turbine engine, in accordance with various embodiments.

Referring now to FIG. 7, a method 100 (and/or functionality) of filtering particulate matter from a fluid filtration assembly begins at a step 102, after which a fluid is injected into a housing with a centrifugal force at a step 104. In various embodiments, the centrifugal force is augmented within the housing by increasing a width of an outer annular flow passage between a first outer surface of a filter and an internal surface of the housing in a step 106. In various embodiments, particulate matter is collected from the fluid in a collection area due to the augmented centrifugal force before the particulate matter impacts the filter in a step 108, after which the method 100 ends at a step 110, in various embodiments.

In various embodiments, the method 100 of FIG. 7 further comprises discharging the fluid from the housing. In various embodiments, the fluid filtration assembly of the method 100 of FIG. 7 is an oil filtration assembly, and/or the fluid is an oil. In various embodiments, the oil filtration assembly is an oil filtration assembly of a gas turbine engine. In various embodiments, the method 100 of FIG. 7 further comprises additionally augmenting the centrifugal force by imparting an additional rotational force to the fluid as the fluid enters the housing, such as by a turning valve assembly.

In accordance with the description herein, technical benefits and effects of this disclosure include reducing amounts of debris and/or particulate matter that is introduced to a filter of a fluid filtration assembly, such as an oil filtration assembly, thereby extending and/or increasing the life of the filter, reducing maintenance demands on the filter and/or a gas turbine engine, improving troubleshooting and/or preventive maintenance of the gas turbine engine, enabling different filters and/or filter materials to be used, enabling smaller filters to be used, etc.

Advantages, benefits, improvements, and solutions, etc. have been described herein with regard to specific embodiments. Furthermore, connecting lines shown in the various figures contained herein are intended to represent exemplary functional relationships and/or physical couplings between the various elements. It should be noted that many additional and/or alternative functional relationships or physical connections may be present in a practical system. However, the advantages, benefits, improvements, solutions, etc., and any elements that may cause any advantage, benefit, improvement, solution, etc. to occur or become more pronounced are not to be construed as critical, essential, or required elements or features of this disclosure.

The scope of this disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching may be used throughout the figures to denote different parts, but not necessarily to denote the same or different materials. Like depictions and numerals also generally represent like elements.

The steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, connected, fixed, or the like may include full, partial, permanent, removable, temporary and/or any other possible attachment option. Additionally, any reference to without contact (or similar phrases) may also include reduced contact or minimal contact. Surface shading lines may be used throughout the figures to denote different areas or parts, but not necessarily to denote the same or different materials. In some cases, reference coordinates may or may not be specific to each figure.

Apparatus, methods, and systems are provided herein. In the detailed description herein, references to "one embodiment," "an embodiment," "various embodiments," etc., indicate that the embodiment described may include a particular characteristic, feature, or structure, but every embodiment may not necessarily include this particular characteristic, feature, or structure. Moreover, such phrases may not necessarily refer to the same embodiment. Further, when a particular characteristic, feature, or structure is described in connection with an embodiment, it is submitted that it is within the knowledge of one skilled in the art to affect such characteristic, feature, or structure in connection with other embodiments, whether or not explicitly described. After reading the description, it will be apparent to one skilled in the relevant art(s) how to implement this disclosure in alternative embodiments.

Furthermore, no component, element, or method step in the present disclosure is intended to be dedicated to the public regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover a non-exclusive inclusion, such that an apparatus, article, method, or process that comprises a list of elements does not include only those elements, but it may also include other elements not expressly listed or inherent to such apparatus, article, method, or process.

What is claimed is:

1. A fluid filtration assembly, comprising:
   a housing having a thickness defined between an internal surface of the housing and an external surface of the housing, the housing extending in an axial direction from a first end to a second end, the external surface defining an outer diameter of the housing, the outer diameter remaining constant from the first end to the second end;
   a first filter having a first radially outer surface and a first radially inner surface, the first filter disposed in the housing, the first radially outer surface and the internal surface of the housing defining an outer annular flow passage;
   a cavity disposed radially inward of the first filter;
   an inlet pipe in fluid communication with the outer annular flow passage, the inlet pipe disposed at the first end, the inlet pipe disposed substantially tangentially to the internal surface of the housing;
   an outlet pipe in fluid communication with the cavity to discharge the fluid from the housing, the outlet pipe disposed at the first end; and
   a collection area disposed at the second end of the housing, the collection area configured to collect particulate matter from the fluid, wherein:
      the fluid is configured to flow radially from the outer annular flow passage through the first radially outer surface of the first filter and the first radially inner surface of the first filter into the cavity,
      the fluid is configured to flow axially from the cavity out the outlet pipe, and
      in response to injecting the fluid substantially tangentially to the internal surface of the housing through the inlet pipe, the particulate matter is forced against the internal surface of the housing within the outer annular flow passage, wherein the thickness of the housing gradually decreases towards the collection area.

2. The fluid filtration assembly of claim 1, wherein a width of the outer annular flow passage increases towards the collection area to augment a centrifugal force.

3. The fluid filtration assembly of claim 1, wherein the fluid filtration assembly is an oil filtration assembly and the fluid is an oil.

4. The fluid filtration assembly of claim 1, further comprising a drain plug proximate an end cap near the collection area.

5. The fluid filtration assembly of claim 1, further comprising a turning vane assembly proximate the inlet pipe.

6. The fluid filtration assembly of claim 1, further comprising a second filter configured within the first filter.

7. The fluid filtration assembly of claim 1, wherein the thickness gradually decreases from a first section to a second section of the fluid filtration assembly along an overlength of the housing.

8. A gas turbine engine, comprising:
a fan section configured to induce air from a surrounding environment into the gas turbine engine;
a compressor section in fluid communication with the fan section and configured to compress the air received from the fan section;
a combustor section in fluid communication with the compressor section and configured to ignite a fuel-air mixture to generate combustion gases;
a turbine section in fluid communication with the combustor section; and
a debris capture device to remove particulate matter from fluids associated with lubricating rotating components of the gas turbine engine, comprising:
an inlet pipe disposed substantially tangentially to an internal surface of a housing;
an outlet pipe; and
an oil filtration assembly, comprising:
the housing having a thickness defined between the internal surface of the housing and an external surface of the housing, the housing extending in an axial direction from a first end to a second end, the inlet pipe and the outlet pipe both disposed at the first end, the external surface defining an outer diameter of the housing, the outer diameter remaining constant from the first end to the second end;
a first filter having a first radially outer surface and a first radially inner surface, the first filter disposed in the housing, the first radially outer surface and the internal surface of the housing defining an outer annular flow passage;
a cavity disposed radially inward of the first filter, the cavity in fluid communication with the outer annular flow passage; and
a collection area disposed at the second end of the housing, the collection area configured to collect the particulate matter from an oil, wherein:
the inlet pipe is in fluid communication with the outer annular flow passage,
the outlet pipe is in fluid communication with the cavity to discharge the oil from the housing,
the oil is configured to flow radially from the outer annular flow passage through the first radially outer surface of the first filter and the first radially inner surface of the first filter into the cavity,
in response to injecting the oil substantially tangentially to the internal surface of the housing, the particulate matter is forced against the internal surface of the housing within the outer annular flow passage, and
the thickness of the housing gradually decreases towards the collection area.

9. The gas turbine engine of claim 8, wherein a width of the outer annular flow passage increases towards the collection area to augment a centrifugal force.

10. The gas turbine engine of claim 8, further comprising a drain plug proximate an end cap near the collection area.

11. The gas turbine engine of claim 8, further comprising a turning vane assembly proximate the inlet pipe.

12. The gas turbine engine of claim 8, further comprising a second filter configured within the first filter.

\* \* \* \* \*